UNITED STATES PATENT OFFICE.

ALPHONSE THÉOPHILE SCHLOESING, OF PARIS, FRANCE, ASSIGNOR TO NORSK HYDRO-ELEKTRISK KVÆLSTOFAKTIESELSKAB, OF CHRISTIANIA, NORWAY.

PROCESS OF ABSORBING NITROUS VAPORS OR GASES IN BURNT LIME.

1,177,359.  Specification of Letters Patent.  Patented Mar. 28, 1916.

No Drawing.  Application filed September 24, 1913.  Serial No. 791,677.

*To all whom it may concern:*

Be it known that I, ALPHONSE THÉOPHILE SCHLOESING, a citizen of France, residing at Paris, France, have invented certain new and useful Improvements in Processes of Absorbing Nitrous Vapors or Gases in Burnt Lime; and I do hereby declare the following to be a full, clear, and exact description of the invention, such as will enable others skilled in the art to which it appertains to make and use the same.

This invention has for its object a process for the absorption of nitrous gases or vapors by means of lime.

Nitrous vapors or gases in mixture with air or other gas may very well be absorbed by means of bringing the mixture into contact with lime or briquets of lime at a temperature of about 300 or 400 degrees centigrade. The absorption is a regular one and may be carried out in a series of chambers, each of which may be isolated from the remainder of the series for enabling the discharge of the final product and subsequent charging with lime or briquets of lime. In this manner nitrate of lime without nitrite is regularly obtained. If the gas mixture at the moment at which it enters into the apparatus has a temperature of about 700° C. preferably 800° C. or more, as when it comes from an electric furnace or when having been heated in other manner for the purpose of oxidizing the nitrogen the heat of the same may be utilized for the purpose of burning the calcareous material from which the lime necessary for the absorption is produced, the expenses connected with the use of combustibles being then avoided.

For producing briquets of burnt lime according to this method, briquets of the calcareous material are first produced whereupon these briquets are burnt as described. The transformation of the carbonates of lime into lime may also be effected at a comparatively low temperature in such manner that the lime obtained whether it is in the form of briquets or in pieces is very suitable for obtaining a very efficient absorption of the nitrous vapors. The said burning of the calcareous material may be effected in any suitable apparatus the hot gas being either circulated around vessels containing the material to be burned or the gas may be used to heat a current of an auxiliary gas the burning of the calcareous material being then effected by direct contact with the said auxiliary gas which is the gas residue from the nitrate absorption.

Lime is customarily burnt in present day kilns at higher temperatures, usually 900° to 1000° C., and at that temperature the heat is not uniformly distributed, so that those portions of the lime-stone charge near the fire are heated to a higher temperature. I have found that lime burnt at 900° C. and over is not well suited to the absorption of nitrous gases.

Calcium carbonate materials burnt at low temperatures by known processes require such a long time for burning that the product is too costly for commercial use. I have discovered that calcium carbonate materials can be burnt at the low temperatures mentioned in the manner described without unduly lengthening the burning period; that such lime is very uniform, is not so hard, is very ready to react, and will rapidly and completely absorb nitrous gases, much better than will ordinary lime.

I claim:—

1. The process of producing nitrate of lime, which comprises causing oxygen and nitrogen to combine in the presence of sufficient heat, abstracting the heat from said gases by means of lime stone to cool them to absorption temperature and simultaneously form lime, and absorbing said cooled gases in the lime so produced.

2. The process of producing nitrate of lime comprising in combination the steps of producing nitrous gases from air by an endothermic reaction, removing heat from the resulting hot nitrous gas by transmission to a suitable medium, then absorbing the cooled nitrous gas in lime, thereby producing nitrate of lime, reheating the residual gas by means of hot nitrous gas obtained by the said endothermic operation and passing said reheated residual gas through carbonate of lime.

3. The process of producing nitrate of lime, which comprises causing oxygen and nitrogen to combine in the presence of sufficient heat, cooling the resulting nitrous products to absorption temperature by a current of an auxiliary gas by direct contact with limestone and simultaneously producing lime, and finally absorbing the cooled nitrous products in the lime so produced.

4. The process of producing nitrates, which comprises causing oxygen and nitrogen to combine in the presence of heat, abstracting the heat from the resulting nitrous gases by a suitable cooling substance capable of dissociation into a gas and a solid residue capable of absorbing nitrous gases and until said nitrous gases have been cooled to absorption temperature, then absorbing said gases in said solid residue at the absorption temperature.

5. The process, which comprises burning calcium carbonate material at a temperature from 700° to 800° C., and absorbing cooled nitrous gases therein.

6. The process, which comprises burning calcium carbonate material by means of hot gases at a temperature from 700° C. to 800° C., and absorbing cooled nitrous gases in the resulting lime.

7. The process, which comprises burning calcium carbonate material at a low temperature by means of a neutral gas passed therethrough, cooling nitrous gases by supplying the heat to said neutral gas, and absorbing the cooled nitrous gases in the lime produced.

In testimony that I claim the foregoing as my invention, I have signed my name in presence of two subscribing witnesses.

ALPHONSE THÉOPHILE SCHLOESING.

Witnesses:
HANSON C. COXE,
ALEXIS PETITPIENE.

Copies of this patent may be obtained for five cents each, by addressing the "Commissioner of Patents, Washington, D. C."